US011580736B2

(12) United States Patent
Osindero et al.

(10) Patent No.: US 11,580,736 B2
(45) Date of Patent: Feb. 14, 2023

(54) PARALLEL VIDEO PROCESSING NEURAL NETWORKS

(71) Applicant: DeepMind Technologies Limited, London (GB)

(72) Inventors: Simon Osindero, London (GB); Joao Carreira, St. Albans (GB); Viorica Patraucean, London (GB); Andrew Zisserman, London (GB)

(73) Assignee: DeepMind Technologies Limited, London (GB)

( * ) Notice: Subject to any disclaimer, the term of this patent is extended or adjusted under 35 U.S.C. 154(b) by 169 days.

(21) Appl. No.: 16/954,068

(22) PCT Filed: Jan. 7, 2019

(86) PCT No.: PCT/EP2019/050210
§ 371 (c)(1),
(2) Date: Jun. 15, 2020

(87) PCT Pub. No.: WO2019/134987
PCT Pub. Date: Jul. 11, 2019

(65) Prior Publication Data
US 2021/0027064 A1    Jan. 28, 2021

Related U.S. Application Data

(60) Provisional application No. 62/614,323, filed on Jan. 5, 2018.

(51) Int. Cl.
*G06V 20/40* (2022.01)
*G06N 3/04* (2006.01)
(Continued)

(52) U.S. Cl.
CPC ............ *G06V 20/40* (2022.01); *G06N 3/049* (2013.01); *G06N 3/0445* (2013.01);
(Continued)

(58) Field of Classification Search
CPC ...... G06V 20/40; G06V 10/82; G06N 3/0445; G06N 3/0454; G06N 3/049; G06T 2207/20084; G06T 1/20; G06T 2200/28
See application file for complete search history.

(56) References Cited

U.S. PATENT DOCUMENTS 9,811,775 B2 *  11/2017  Krizhevsky ............... G06T 1/20
10,402,697 B2 *   9/2019  Yang ......................... G06N 3/04
(Continued)

OTHER PUBLICATIONS

Ji et al: "3D Convolutional Neural Networks for Human Action Recognition," in IEEE Transactions on Pattern Analysis and Machine Intelligence, vol. 35, No. 1, pp. 221-231, Jan. 2013, doi: 10.1109/TPAMI.2012.59. (Year: 2013).*
(Continued)

*Primary Examiner* — Boubacar Abdou Tchoussou
(74) *Attorney, Agent, or Firm* — Fish & Richardson P.C.

(57) ABSTRACT

Methods, systems, and apparatus, including computer programs encoded on computer storage media, for parallel processing of video frames using neural networks. One of the methods includes receiving a video sequence comprising a respective video frame at each of a plurality of time steps; and processing the video sequence using a video processing neural network to generate a video processing output for the video sequence, wherein the video processing neural network includes a sequence of network components, wherein the network components comprise a plurality of layer blocks each comprising one or more neural network layers, wherein each component is active for a respective subset of the plurality of time steps, and wherein each layer block is configured to, at each time step at which the layer block is active, receive an input generated at a previous time step and to process the input to generate a block output.

20 Claims, 5 Drawing Sheets

(51) Int. Cl.
G06T 1/20 (2006.01)
G06N 3/049 (2023.01)

(52) U.S. Cl.
CPC ............. *G06N 3/0454* (2013.01); *G06T 1/20* (2013.01); *G06T 2200/28* (2013.01); *G06T 2207/20084* (2013.01)

(56) References Cited

U.S. PATENT DOCUMENTS

2015/0339571 A1* 11/2015 Krizhevsky .......... G06V 10/454
382/158
2021/0150702 A1* 5/2021 Claessen ................. G06T 17/10

OTHER PUBLICATIONS

Abadi et al., "TensorFlow: Large-scale machine learning on heterogeneous distributed systems," CoRR, Mar. 2016, https://arxiv.org/abs/1603.04467, 19 pages.

Alcantarilla et al., "Street-view change detection with deconvolutional networks," Autonomous Robots, 2018, 42(7):1301-1322.

Andriluka et al., "PoseTrack: A benchmark for human pose estimation and tracking," CoRR, Oct. 27, https://arxiv.org/abs/1710.10000, 10 pages.

Belagiannis et al., "Recurrent human pose estimation," 2017 12th IEEE International Conference on Automatic Face & Gesture Recognition (FG 2017), May 30-Jun. 3, 2017, pp. 468-475.

Carreira et al., "Human pose estimation with iterative error feedback," Proceedings of the IEEE Conference on Computer Vision and Pattern Recognition (CVPR), Jun. 27-30, 2016, pp. 4733-4742.

Carreira et al., "Massively Parallel Video Networks," CoRR, Jun. 2018, https://arxiv.org/abs/1806.03863, 27 pages.

Carreira el al., "Quo vadis, action recognition? A new model and the kinetics dataset," proceedings of the IEEE Conference on Computer Vision and Pattern Recognition (CVPR), Jul. 21-26, 2017, pp. 6299-6308.

Chen et al., "Compressing neural networks with the hashing trick," Proceedings of the 32nd International Conference on Machine Learning, 2015, 37:2285-2294.

Chen et al., "Pipelined back-propagation for context-dependent deep neural networks," 13th Annual Conference of the International Speech Communication Association, Sep. 9-13, 2012, pp. 26-29.

Courbariaux et al., "Binarized neural networks: Training deep neural networks with weights and activations constrained to +1 or −1," CoRR, Feb. 2016, https://arxiv.org/abs/1602.02830, 11 pages.

Figumov el al., "Spatially adaptive computation time for residual networks," Proceedings of the IEEE Conference on Computer Vision and Pattern Recognition (CVPR), Jul. 21-26, 2017, pp. 1790-1799.

Gu et al., "AVA: A video dataset of spatio-temporally localized atomic visual actions," Proceedings of the IEEE Conference on Computer Vision and Pattern Recognition (CVPR), 2018, pp. 6047-6056.

He et al., "Mask R-CNN," IEEE International Conference on Computer Vision, Oct. 22-29, 2017, pp. 2980-2988.

Heilbron et al., "ActivityNet: A largescale video benchmark for human activity understanding," Proceedings of the IEEE Conference on Computer Vision and Pattern Recognition (CVPR), Jun. 7-12, 2015, pp. 961-970.

Hinton et al., "Distilling the knowledge in a neural network," CoRR, Mar. 2015, https://arxiv.org/abs/1503.02531, 9 pages.

Howard et al., "Mobilenets: Efficient convolutional neural networks for mobile vision applications," CoRR, Apr. 2017, https://arxiv.org/abs/1704.04861, 9 pages.

Huang et al., "Densely connected convolutional networks," Proceedings of the IEEE Conference on Computer Vision and Pattern Recognition (CVPR), Jul. 21-26, 2017, pp. 4700-4708.

Ilg et al., "Flownet 2.0: Evolution of optical flow estimation with deep networks," Proceedings of the IEEE conference on computer vision and pattern recognition (CVPR 2017), Jul. 21-26, 2017, pp. 2462-2470.

Jaderberg et al., "Decoupled neural interfaces using synthetic gradients," Proceedings of the 34th International Conference on Machine Learning, Aug. 6-11, 2017, 70:1627-1635.

Jampani et al., "Video propagation networks," Proceedings of the IEEE Conference on Computer Vision and Pattern Recognition (CVPR), Jul. 21-26, 2017, pp. 451-461.

Karayev et al., "Anytime recognition of objects and scenes," Proceedings of the IEEE Conference on Computer Vision and Pattern Recognition (CVPR), Jun. 23-28, 2014, pp. 572-579.

Kay et al., "The kinetics human action video dataset," CoRR, May 2017, https://arxiv.org/abs/1705.06950, 22 pages.

Koutnik et al., "A clockwork RNN," CoRR, Feb. 2014, https://arxiv.org/abs/1402.3511, 9 pages.

Li et al., "Iterative instance segmentation," Proceedings of the IEEE Conference on Computer Vision and Pattern Recognition (CVPR), Jun. 27-30, 2016, pp. 3659-3667.

Long et al., "Fully convolutional networks for semantic segmentation," Proceedings of the IEEE Conference on Computer Vision and Pattern Recognition (CVPR), Jun. 7-12, 2015, pp. 3431-3440.

Mathe et al., "Reinforcement learning for visual object detection," Proceedings of the IEEE Conference on Computer Vision and Pattern Recognition (CVPR), Jun. 27-30, 2016, pp. 2894-2902.

Neil et al., "Phased LSTM: accelerating recurrent network training for long or event-based sequences," Advances in Neural Information Processing Systems 29 (NIPS 2016), 2016, 9 pages.

Papandreou et al., "Towards accurate multi-person pose estimation in the wild," Proceedings of the IEEE Conference on Computer Vision and Pattern Recognition (CVPR), 2017, pp. 4903-4911.

Patraucean et al., "Spatio-temporal video autoencoder with differentiable memory," CoRR, Nov. 2015, https://arxiv.org/abs/1511.06309, 13 pages.

PCT International Preliminary Report on Patentability in International Appln. No. PCT/EP2019/050210, dated Jul. 7, 2020, 8 pages.

PCT International Search Report and Written Opinion in International Appln. No. PCT/EP2019/050210, dated Apr. 11, 2019, 15 pages.

Petrowski et al., "Performance analysis of a pipelined backpropagation parallel algorithm," IEEE Transactions on Neural Networks, Nov. 1993, 4(6):970-981.

Pfister et al., "Flowing convnets for human pose estimation in videos," Proceedings of the IEEE International Conference on Computer Vision (ICCV), Dec. 7-13, 2015, pp. 1913-1921.

Rasmus et al., "Semi-supervised learning with ladder networks," Advances in Neural Information Processing Systems 28 (NIPS 2015), 2015, 9 pages.

Redmon et al., "YOLO9000: better, faster, stronger," Proceedings of the IEEE Conference on Computer Vision and Pattern Recognition (CVPR), Jul. 21-26, 2017, 7263-7271.

Ren et al., "Towards real-time object detection with region proposal networks," Advances in Neural Infotmation Processing Systems, 2015, 28:91-99.

Ronneberger et al., "Convolutional networks for biomedical image segmentation," Medical Image Computing and Computer-Assisted Intervention—MICCAI 2015, Oct. 5-9, 2015, pp. 234-241.

Shelhamer et al., "Clockwork Convnets for Video Semantic Segmentation," Computer Vision—ECCV 2016 Workshops, Nov. 2016, 3:852-868.

Simonyan et al., "Two-stream convolutional networks for action recognition in videos," Advances in Neural Information Processing Systems 27, Dec. 8-13, 2014, 9 pages.

Simonyan et al., "Very deep convolutional networks for large-scale image recognition," CoRR, Sep. 2014, https://arxiv.org/abs/1409.1556, 14 pages.

Srivastava et al., "Unsupervised learning of video representations using LSTMs," Proceedings of the 32nd International Conference on Machine Learning, Jul. 6-11, 2015, 37:843-852.

Stollenga et al., "Deep networks with internal selective attention through feedback connections," Advances in Neural Information Processing Systems 27: (NIPS 2014), Dec. 8-13, 2014, 9 pages.

(56) References Cited

OTHER PUBLICATIONS

Szegedy et al., "Going deeper with convolutions," Proceedings of the IEEE Conference on Computer Vision and Pattern Recognition (CVPR), Jun. 7-12, 2015, 9 pages.
Tokmakov et al., "Learning video object segmentation with visual memory," Proceedings of the IEEE International Conference on Computer Vision (ICCV), Oct. 22-29, 2017, pp. 4491-4500.
Tran et al., "Learning spatiotemporal features with 3d convolutional networks," Proceedings of the IEEE International Conference on Computer Vision (ICCV), Dec. 7-13, 2015, pp. 4489-4497.
Van den Oord, et al., "Wavenet: A generative model for raw audio," CoRR, Sep. 2016, https://arxiv.org/abs/1609.03499, 15 pages.
Vezhnevets et al., "FeUdal networks for hierarchical reinforcement learning," CoRR, Mar. 2017, https://arxiv.org/abs/1703.01161, 12 pages.
Wiskott et al., "Slow feature analysis: Unsupervised learning of invariances," Neural Computation, 2002, 14(4):715-770.
Xie et al., "Rethinking spatiotemporal feature learning for video understanding," CoRR, Dec. 2017, arXiv:1712.04851v1, 10 pages.
Zamir et al., "Feedback networks," Proceedings of the IEEE Conference on Computer Vision and Pattern Recognition (CVPR), Jul. 21-26, 2017, pp. 1308-1317.
Zeki, "A massively asynchronous, parallel brain," Philosophical Transactions of the Royal Society of London B: Biological Sciences, May 2015, 370(1668):1-14.
Zhu et al., "Deep feature flow for video recognition," Proceedings of the IEEE Conference on Computer Vision and Pattern Recognition (CVPR), Jul. 21-26, 2017, pp. 2349-2358.
Zhu et al., "Flow-guided feature aggregation for video object detection," Proceedings of the IEEE International Conference on Computer Vision (ICCV), Oct. 22-29, 2017, pp. 408-417.

\* cited by examiner

PARALLEL VIDEO PROCESSING NEURAL NETWORKS

CROSS-REFERENCE TO RELATED APPLICATION

This application is a National Stage Application under 35 U.S.C. § 371 and claims the benefit of International Application No. PCT/EP2019/050210, filed on Jan. 7, 2019, which claims priority to U.S. Provisional Application Ser. No. 62/614,323, filed on Jan. 5, 2018. The disclosure of the prior application is considered part of and is incorporated by reference in the disclosure of this application.

BACKGROUND

This specification relates to processing videos using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

In general, this specification describes techniques for processing video frames from a video using a video processing neural network that is configured such that significant portions of the processing can be parallelized, i.e., performed at the same time rather than needing to be performed serially. In particular, the video processing neural network includes a sequence of components that includes a plurality of layer blocks. At any given time step during the processing of an input video segment, the operations of the layer blocks can be performed in parallel rather than needing to be performed sequentially, i.e., the operations of each layer block at any given time step can begin being performed without needing to wait for the operations of any other layer block to be completed for the time step.

Thus in one aspect a method comprises receiving a video sequence comprising a respective video frame at each of a plurality of time steps, and processing the video sequence using a video processing neural network to generate a video processing output for the video sequence. In implementations the video processing neural network includes a sequence of network components. The network components may comprise a plurality of layer blocks each comprising one or more neural network layers. In some implementations each component or layer block is active for a respective subset of the plurality of time steps. In implementations each layer block is configured to, at each time step at which the layer block is active, receive an input generated at a previous time step and to process the input to generate a block output.

As used herein the video sequence may include or be synonymous with a video segment as described later. In implementations a network component may comprise a layer block or another neural network component. Thus the sequence of network components may comprise a sequence of the layer blocks. The sequence may be such that an output of one component or layer block is connected to an input of a next component of layer block in the sequence. The sequence of network components may have an input node e.g. to receive the video sequence or a pre-processed version of the video sequence, and an output node, e.g. to provide the video processing output. The method may implement parallelized processing in which operations are performed by the layer blocks in parallel on data from different video frames, e.g. video frames at successive times. Thus processing the video sequence may comprise performing the processing of two or more of the layer blocks in parallel.

As described later the block output may be a per frame output or may be an output defined by a sequence of multiple video frames (a per segment output). The block output from the parallelized processing may be further processed to generate a system output. The method, that is the parallelized processing, may be used to perform any video processing task. For example the neural network layers may be trained to perform the task and the block/system output may provide a task output, for example to identify or locate objects and/or actions in the video sequence, in which case the task output may comprise data for this purpose.

As described later, implementations of this method facilitate pipelining neural network-based video processing and, counter-intuitively, can also provide very low latency processing. This in turn facilitates efficient use of computational resources and also, for example, low-latency processing of video in real-time. For example some implementations process video frame-by-frame (as opposed to batch processing), and generate a causal output, that is an output which at any point in time is based just on past inputs. Some implementations, as described later, may also have a long temporal receptive field.

As previously described, each component or layer block may be active for a respective subset of the plurality of time steps. The subset of the time steps may include all the time steps (i.e. the set and subset may coincide), or the subset may be a so-called proper subset, which does not include all the time steps.

In some implementations each layer block is active for a same number or fewer time steps than any layer block before the layer block in the sequence of components. This can reduce the computational requirements of the method. A layer block may be considered active when it operates to process data. In many practical applications fast varying observations are caused by slow varying factors—for example when performing SLAM (Simultaneous Localization and Mapping) scene pose may change quickly whilst its shape changes slowly or not at all. In another example, when recognizing actions and estimating pose e.g. of a person, pose may change quickly over a period when an action is being performed. Thus later layer blocks in the sequence, which extract higher level, more abstract features, may have a reduced update frequency.

In some implementations, at each time step at which a layer block is active the layer block does not receive as input any outputs generated by any other layer blocks at the time step. In other words, the connections between the layer blocks in the sequence are "diagonal" when unrolled along a time or frame count dimension. This facilitates pipelining the computations. In some implementations one or more skip connections may be implemented, which skip one or more layer blocks (or other network components) in the sequence to reduce latency. Thus a skip connection may be a connection which connects across one or more layer blocks and thus also across one or more layer block processing time steps. This may therefore involve prediction of an output for a frame based on one or more earlier frames, reducing latency based on the recognition that videos are often predictable over short time intervals.

In some implementations a layer block may comprise an initial layer and one or more additional layers. The initial layer in the block may then receive an input generated at the previous time step by a component that precedes the layer block in the sequence of components. Optionally each additional layer in the block may receive an output generated by one or more layers at a lower depth level within the same block at the time step. Here a lower depth level may be a level which is closer to an input of the sequence of components.

In some implementations of the method a layer block in the sequence of components may also receive as input a feedback output generated at a previous time step by one or more components, such as one or more layer blocks, after the layer block in the sequence of components. Thus there may be feedback of activations from higher layers into lower layers which may help, particularly where prediction is involved, by making higher level, slower changing representations of the video available to the lower layers.

One or more of the layer blocks may include a three-dimensional convolutional layer with a kernel that has a time dimension of two or more i.e. that spans two or more time steps or video frames. Each such layer block may also receive an input generated at another previous time step.

The video processing output may be a per-sequence output that includes a single prediction for the video segment and/or a per-frame output that includes a respective prediction for each of multiple frames in the video segment.

The video processing neural network may further comprise one or more layers after the final layer block in the sequence that are configured to receive the block outputs generated by one or more of the layer blocks and to process the block outputs to generate the video processing output.

Particular embodiments of the subject matter described in this specification can be implemented so as to realize one or more of the following advantages.

The neural networks described in this specification can process videos in a manner that is much more computationally efficient than existing neural networks. In particular, the architectures of the described neural networks allow the computation of the neural network to be highly parallelized. In particular, at any given time step, the operations of multiple layer blocks can be performed in parallel, e.g., on different computing cores, e.g., central processing unit (CPU) cores, or on multiple different graphics processing units (GPUs). Additionally, the described architectures require minimal computation to generate a new prediction for a newly-received frame. Because of this, the neural networks can generate very low-latency predictions even for tasks that require a prediction to be made for each frame of the video while still maintaining a high prediction quality. In particular, the operations performed by the neural network are causal, i.e., the prediction for a given frame does not depend on any frames after the given frame in the video, and the operations performed by the layer blocks in the neural network are parallel and pipelined, i.e., at any given time step, different layer blocks are processing (in parallel) data derived from different video frames. For example, at one time step, the lowest layer block in the sequence can process data derived from the video frame at the time step while, in parallel, another layer block processes data derived from the video frame at the preceding time step. Because of this, the described systems can effectively be used for tasks that require accurate predictions to be made with minimal latency and without consuming excessive amounts of computational resources. In other words, the neural networks described in this specification are specially configured to be implemented to make online predictions on parallel processing hardware.

Additionally, in some cases, because the operations of the neural networks can be performed in parallel and by making use of multi-rate clocks, the network can effectively capture fast-varying features and slow-varying, higher-level features within the video segments.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
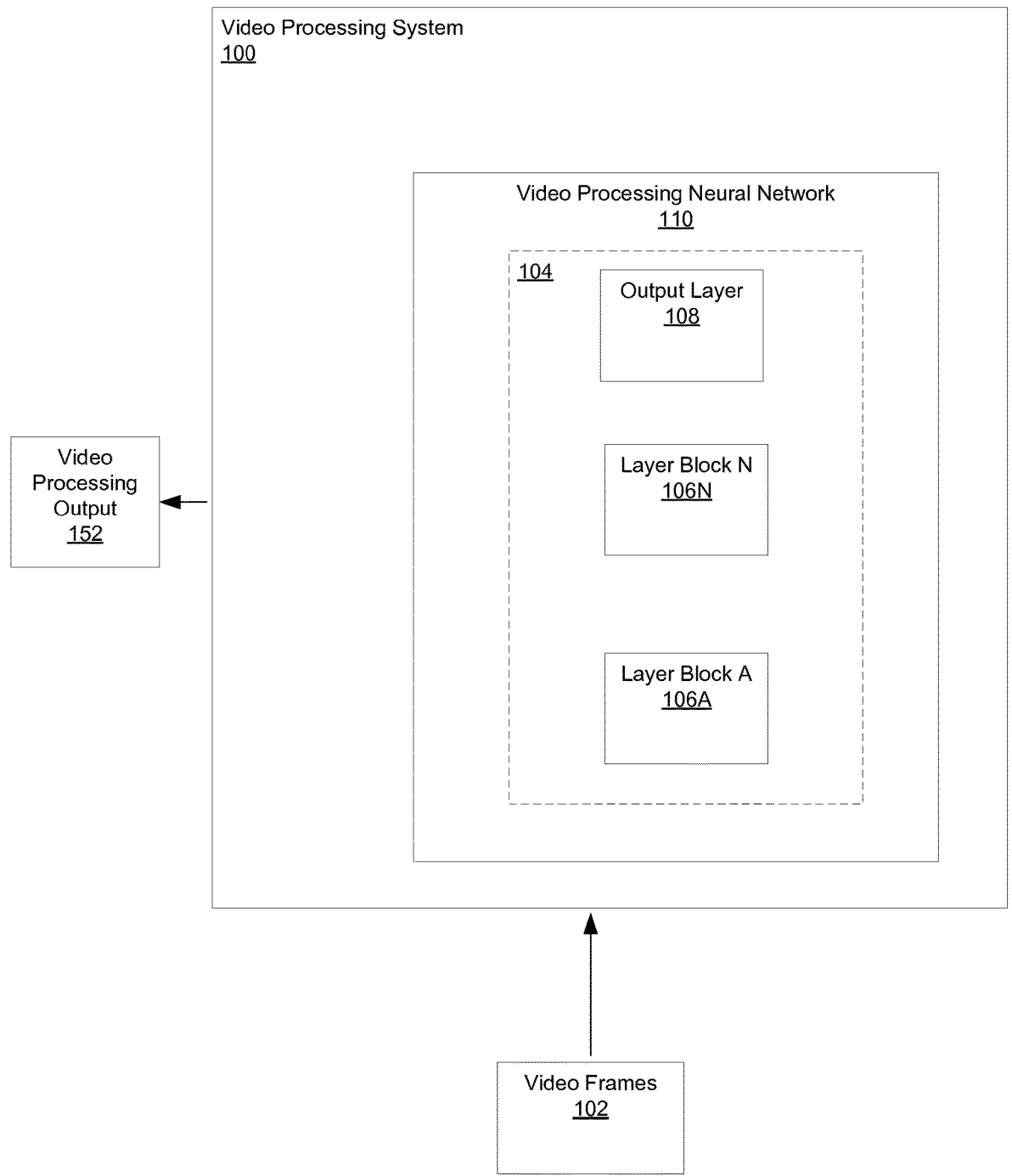
FIG. 1 shows an example video processing system.

FIG. 1 shows an example video processing system 100. The video processing system 100 is an example of a system implemented as computer programs on one or more computers in one or more locations, in which the systems, components, and techniques described below can be implemented.

The video processing system 100 receives an input video segment that includes multiple video frames 102, i.e., a respective video frame 102 at each of multiple time steps, and uses a video processing neural network 110 to perform a particular video processing task on the received video segment in order to generate a video processing output 150.

In some cases, the video processing task is a per-sequence task, i.e., a task that requires a single prediction to be made for the entire video segment. For example, the video processing task can be an action classification task that predicts an action that is being performed over the course of the frames in the video segment by an agent depicted in the video segment. In other words, the video processing system 100 generates a video processing output 150 that classifies the action being performed by the agent in the video segment, i.e., an output that identifies one or more actions and, optionally, for each of the identified actions, a respective probability that the agent is preforming the identified action in the video segment.

In some other cases, the video processing task is a per-frame task, i.e., a task that requires a separate prediction to be made for each frame in the video segment or, at a minimum, for a significant portion of the frames in the video segment. For example, the video processing task can be a pose estimation task that predicts (i.e. estimates), for each of multiple frames in the video segment, the pose of an agent or object depicted in the frame, e.g., by generating an output that identifies the location of each of multiple joints of the agent or object in the frame, or an object detection task that predicts (estimates) the location of an object in each frame of multiple frames in the video segment.

More specifically, the video processing neural network 110 is configured such that the video processing system 100 can perform much of the processing required for any given video frame in parallel, i.e., instead of sequentially. This results in the video processing system 100 being able to maximize available processing power and produce video processing outputs with minimal latency.

Because of this, the video processing system 100 may be particularly useful for being implemented in resource-constrained environments, e.g., on mobile devices or on other computing devices having limited processing power or memory storage capacity.

Additionally or alternatively, the video processing system 100 may be particularly useful for performing video processing tasks as part of larger, latency-sensitive systems, i.e., systems that require video processing tasks to be performed with minimal latency. For example, the video processing system 100 may be implemented on-board a self-driving vehicle or robot and the outputs generated can be used to control the self-driving vehicle or the robot. As another example, the video processing system 100 may be used to analyze and, optionally, modify a live video broadcast. As yet another example, the video processing system 100 may be used for automatic features of a camera on a mobile device or other user computer, e.g., as part of an auto-focus feature that determines where to focus a mobile device camera based on the video processing outputs generated by the system 100.

In particular, the video processing neural network 110 includes a sequence 104 of neural network components. The sequence 104 includes a plurality of layer blocks 106A-N and an output layer 108. Optionally, the sequence 104 can also include one or more other neural network components, e.g., one or more conventional neural network layers, e.g., convolutional layers, max pooling layers, and so on, before the first layer block 106A in the sequence 104, after the last layer block 106N in the sequence and before the output layer, or both. For example, for dense prediction tasks (e.g. predicting a label for each pixel or for multiple regions of the video frame), the sequence 104 can include a decoder neural network head that includes a stack of convolutional layers, fully-connected layers, or both, that are configured to receive an input and generate the dense prediction map.

Each layer block 106A-N includes one or more neural network layers and is active for a subset of the time steps in the video segment. In particular, in some implementations each layer block is active for each time step, i.e., the subset for each of the layer blocks is not a proper subset. In some other implementations, each layer block is active for only a proper subset of the time steps.

More specifically, the neural network 110 may be configured such that, at each time step, all of the operations of the layer blocks that are active at the time step can be performed in parallel, i.e., none of the active layer blocks at the time step receive input from any other active layer blocks at the time step.

In other words, at each time step, the system 100 performs the operations of some or all of the layer blocks 106A-N in parallel. The degree of parallelization can depend on the amount of parallel hardware resources available to the system 100 at any given time step. For example, if the system is implemented on hardware that includes multiple cores such as CPU cores, the system can use different cores to process different ones of the layer blocks 106A-N in parallel at each time step. As another example, if the system is implemented on hardware that includes multiple GPUs, the system can use different GPUs to process different layer blocks in parallel at each time step, e.g., by assigning, at each time step, each layer block to one of the multiple GPUs.

Configurations of the neural network 110 are described in more detail below with reference to FIGS. 2-4.

Figure 2:
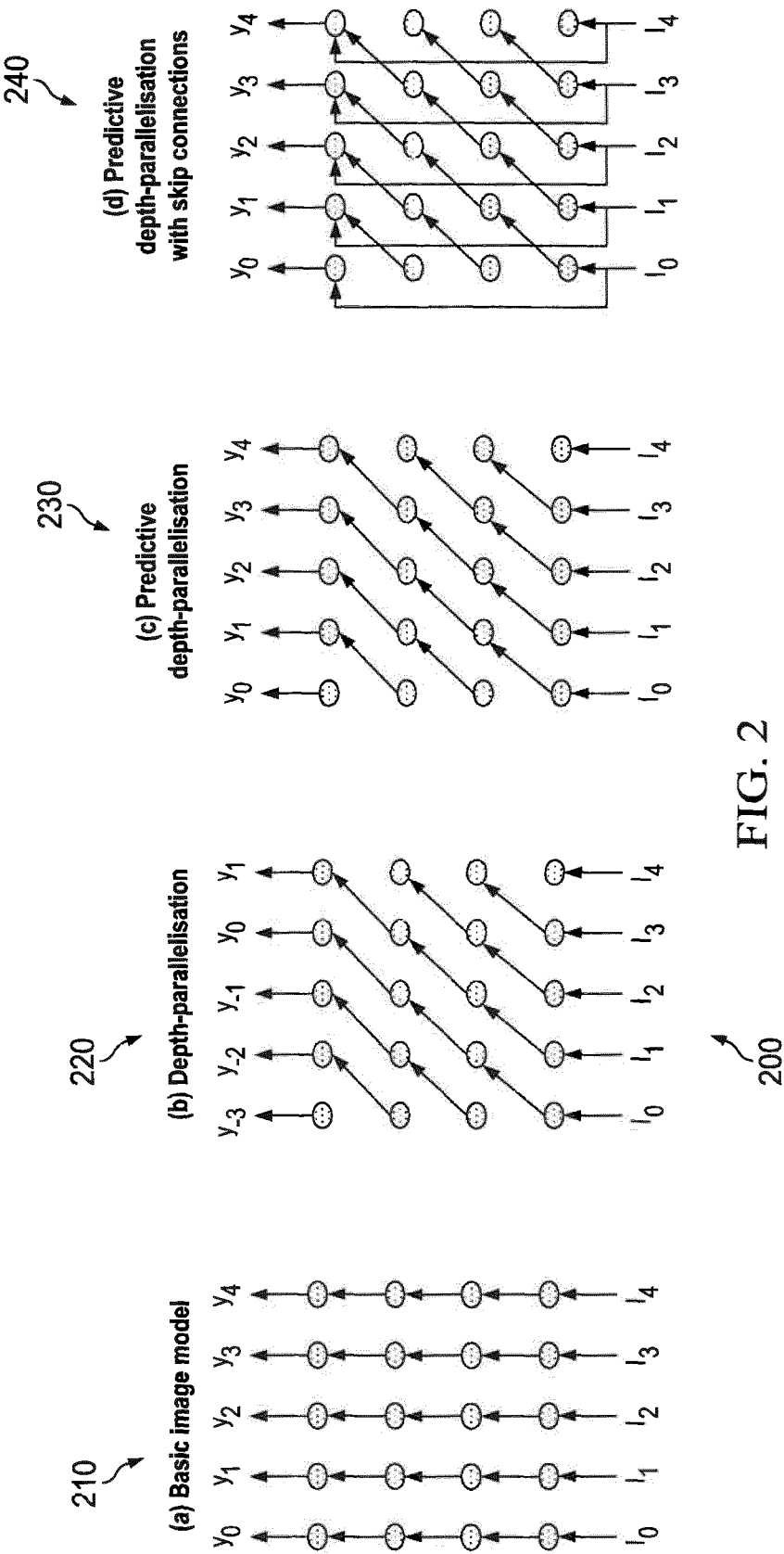
FIG. 2 is a diagram that shows example configurations of the neural network components in the sequence.

FIG. 2 is a diagram 200 that shows example configurations of the neural network components in the sequence 104 within the video processing neural network 110.

In particular, FIG. 2 shows the processing performed by the video processing neural network at four time steps (0, 1, 2, 3, and 4). At each time step, the video processing neural network receives an input video frame I and generates an output (or prediction) y. When the task is a per-sequence task, the outputs for time steps other than the last time step can be discarded or not generated.

In the example of FIG. 2, the sequence includes three layer blocks followed by an output layer that generates the output y. While the example of FIG. 2 shows the first layer block receiving the input video frame, it will be understood that the input video frame may first be processed through one or more other neural network components, e.g., one or more initial convolutional neural network layers, before being provided to the first layer block. Similarly, the output of the last layer block may be processed through one or more other neural network components, e.g., conventionally-configured neural network layers, before being provided to the output layer.

Example configuration 210 ("basic image model") shows the configuration employed by conventional systems. In particular, at each time step, the layer blocks (in the Figure nodes indicated by circles) are connected vertically within the sequence: the input to each layer block is the output of the previous layer block at the same time step, and the network outputs a prediction only after all the layer blocks have processed in sequence the current frame. Thus, the processing of the layer blocks must be performed serially and cannot be parallelized, i.e., because each layer block requires the preceding layer block in the sequence to generate an output before beginning to process.

Example configuration 220 ("depth-parallelism") shows a configuration that allows parallelization and pipelining as described in this specification. In the configuration 220, the connections between layer blocks are diagonal instead of vertical: the input to each layer block at a given time step is the output of the previous layer block from the previous time step instead of at the given time step. Thus, at any given time step, each layer block in the network processes its input, passes the activations to the next layer, and is able to immediately start processing the next input available, without waiting for the whole network to finish computation for the current frame.

As can be seen in the configuration 220, at any given time step, the processing of the layer blocks is pipeline. In other words, each layer block processes data for a different video frame, i.e., derived from a different video frame, from each other video frame. In other words, at any given time step, each layer block is generating data required to make the prediction for a different video frame from each other layer block. The data necessary to make a prediction for a given frame is shown in FIG. 2 as a path of connected nodes starting from the input video frame and ending at the time step at which the output layer makes the prediction for the frame. For example, at time step 3, the lowest layer block is processing the video frame I3, i.e., data necessary to make the prediction y3 for the frame I3, the second lowest layer block is processing data derived from the video frame I2, i.e., data necessary to make the prediction y2 for the frame I2, and the third layer block is processing data derived from the video frame I1, i.e., data necessary to make the prediction y1 for the frame I1.

Because there are no dependencies between layer blocks for a given time step, the system can perform the process for some or all of the layer blocks in parallel at a given time step. As a consequence of the diagonal connectivity, in the configuration 220, the network does not make the prediction corresponding to a given video frame at the same time step that the given video frame is provided to the network, thus incurring prediction latency. In particular, in the example configuration 220, the network is configured to output the prediction for a video frame at the time step at which the input signal from the video frame reaches the output layer, i.e., once the output layer receives an input generated as a consequence of processing the video frame. Thus, in the example configuration 220, the prediction latency is three frames (or, equivalently, three time steps): the network makes the prediction for a given frame three time steps after the given frame is received. For example, the network makes the prediction y0 for the frame I0 at time step 3, i.e., the time step at which frame I3 is received.

For some use cases, such a latency is acceptable. However, in other configurations, to reduce the prediction latency, the neural network can be configured through training to make the prediction for a video frame before the signal reaches the output layer. In the example configuration 230 ("predictive depth-parallelism"), the prediction latency is zero: the network makes the prediction for the given frame at the same time step at which the frame is received. For example, the network makes the prediction y0 for the frame I0 at time step 0, i.e., the same time step at which frame I0 is received. By leveraging the fact that videos generally are predictable over short horizons and by training the neural network appropriately, the neural network can still generate accurate predictions even though the prediction for a given frame is made by the output layer based on features of frames preceding the given frame in the video.

Generally, the neural network can be configured to generate predictions with a prediction latency of anywhere from 0 to the number of time steps at which the input signal from the video frame reaches the output layer. In particular, in implementations that require minimal latency, the system can sacrifice some amount of prediction accuracy and use a zero or small prediction latency. In implementations where some latency is acceptable, the system can be configured to have a larger prediction latency in order to realize some improvement in prediction accuracy.

In implementations where having a low prediction latency is critical, the accuracy of the predictions can be improved by making use of skip connections. A skip connection passes the output of a given component as input to another component that is not directly adjacent (in the sequence) to the given component in the neural network. The example configuration 240 includes a skip connection that passes features from the input frame at a given time step to the output layer for use in generating the prediction for the video frame at the time step. For example, features of the frame I0 are provided to the output layer at time step 0 for use in making the prediction for the prediction y0 for the frame I0 at time step 0.

Generally, however, skip connections can be inserted along any path between any two components in the sequence that preserves the parallelism and pipelining of the layer block processing. That is, the skip connections can be inserted between any two components in the neural network other than between two layer blocks at the same time step. For example, a skip connection can be inserted between the output of one layer block at time step 0 and the output layer (or the other neural network components preceding the output layer) at time step 1.

Figure 3:
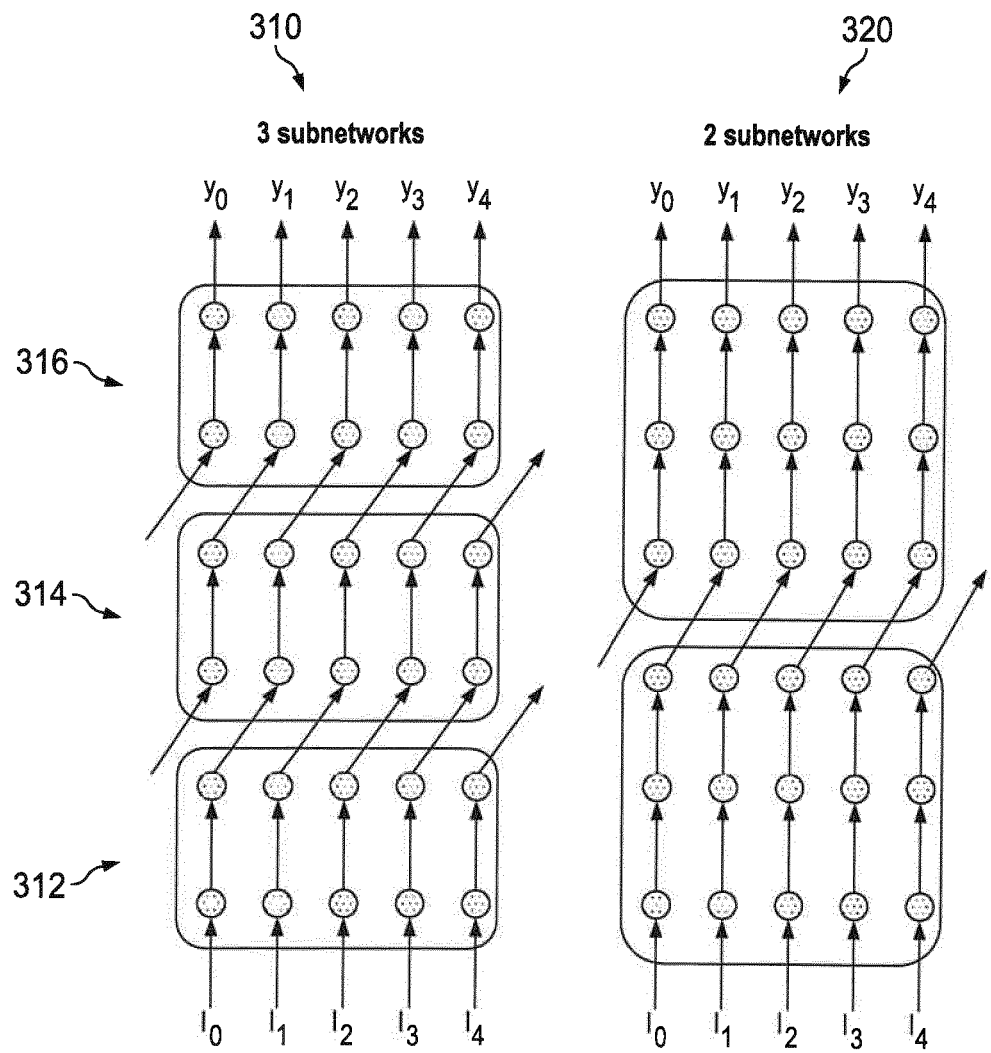
FIG. 3 is a diagram that shows a more detailed view of the configuration of the network components when configured for predictive depth-parallelisation.

FIG. 3 is a diagram 300 that shows a more detailed view of the configuration of the network components when configured for predictive depth-parallelisation.

In particular, FIG. 3 shows two example configurations of the neural network: a configuration 310 with 3 layer blocks (also referred to as "subnetworks") and a configuration 320 with 2 layer blocks.

In the configuration 310, each layer block includes two neural network layers, e.g., convolutional layers. Within the each layer block, the processing is sequential, i.e., at each time step the input to the second layer in the layer block is the output of the first layer block in the sequence at the time step. However, as can be seen in configuration 310, at any given time step there are no dependencies between the layer blocks. Thus, each layer block can be processed in parallel. For example, at time step 1, layer block 314 receives as input the output generated by layer block 312 at time step 0 (and not at time step 1) and layer block 316 receives as input the output generated by layer block 314 at time step 0 (and not at time step 1).

Configuration 320 is similar to configuration 310, except that each layer block includes three neural network layers and there two total layer blocks. As can be seen from FIG. 3, there are no dependencies between the layer blocks in configuration 320 at any given time step.

While FIG. 3 shows that each layer block includes a sequence of the same number of neural network layers, generally the layers within a given layer block can have various configurations and the configuration of layers can differ between layer blocks.

For example, some or all of the layer blocks can be configured as Inception blocks, which include multiple parallel branches of neural network layers, e.g., branches of convolutional layers with various filter sizes and a branch with a max pooling layer, whose outputs are concatenated to generate the output of the Inception block. Inception blocks are described in more detail in Szegedy, C., Liu, W., Jia, Y., Sermanet, P., Reed, S. E., Anguelov, D., Erhan, D., Vanhoucke, V., Rabinovich, A.: Going deeper with convolutions. In: IEEE Conference on Computer Vision and Pattern Recognition, CVPR 2015, Boston, Mass., USA, Jun. 7-12, 2015, IEEE Computer Society (2015). In this example, other layer blocks may still be sequential (e.g., an initial layer block can be a sequence of convolutional layers that transforms the input video frame).

As another example, some or all of the layer blocks can be configured as one or more DenseNet miniblocks, where the miniblocks within each layer block are densely connected such that every miniblock sends its outputs to all the subsequent miniblocks in the same layer block. DenseNet miniblocks are described in more detail in Huang, G., Liu, Z., van der Maaten, L., Weinberger, K. Q.: Densely connected convolutional networks. In: 2017 IEEE Conference on Computer Vision and Pattern Recognition, CVPR 2017, Honolulu, Hi., USA, Jul. 21-26, 2017, IEEE Computer Society (2017) 2261-2269. A miniblock may comprise a set of neural network operations such as one or more of: a 1×1 convolution, an activation function, a batch normalization function, and convolutions with one or more further convolution kernels.

Figure 4:
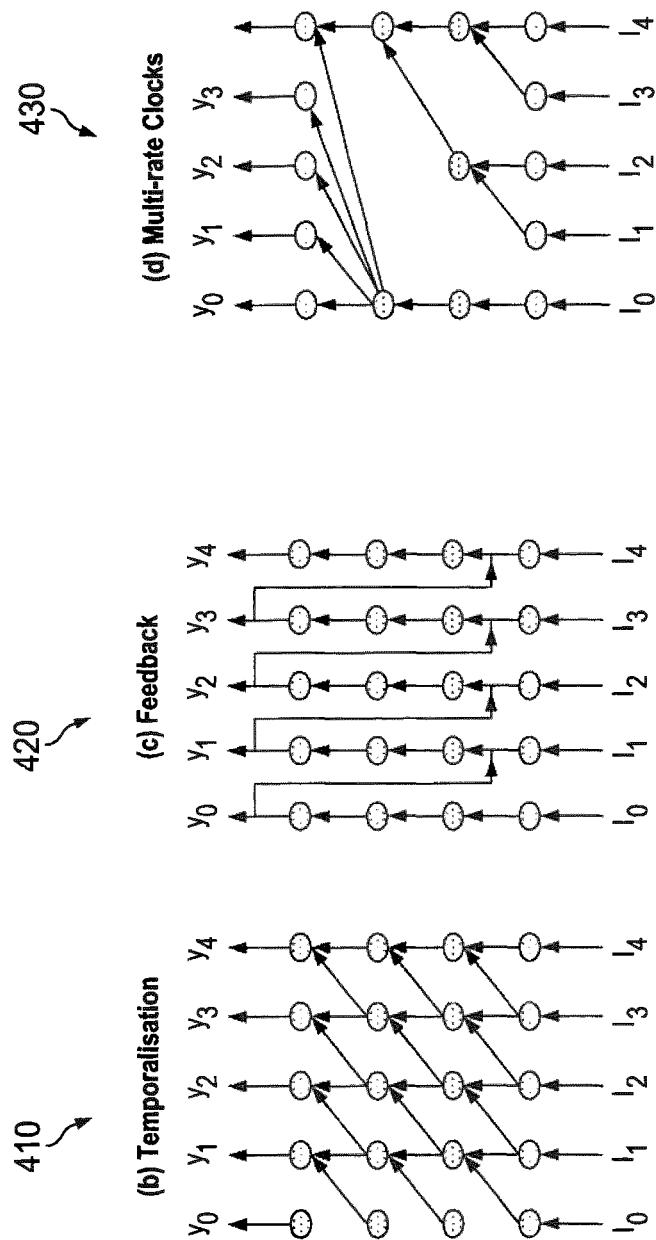
FIG. 4 is a diagram that shows additional connectivity options that can be used to augment a configuration of the neural network components.

FIG. 4 is a diagram 400 that shows additional connectivity options that can be used to augment a configuration of the neural network components.

In particular, FIG. 400 shows three example configurations: a temporalisation configuration 410, a feedback configuration 420, and a multi-rate clock configuration 430. These may be combined.

In the temporalisation configuration 410, some or all of the convolutional layers in the layer blocks have temporal filters, such that they receive additional inputs from past frames. In the example configuration 410, for example, each layer block receives as input the output of the layer block immediately below the layer block both at the current time step and the previous time step, i.e., the filters of the first convolutional layer of each block have a temporal size of two.

To apply the temporalisation configuration 410 in the depth-parallel or predictive depth parallel configurations where there are no vertical connections between layer blocks, a given layer block can receive as input the output from the previous block from the past t time steps, where t is the size of the temporal filter of the first layer of a given block. In other words, some or all of the convolutional layers in the layer blocks are implemented as convolutional layers with a causal temporal filter.

In the feedback configuration 420, the prediction at a given time step is provided as input to one or more of the layer blocks, e.g., to one or more of the first layer blocks in the sequence, at the next time step. These additional feedback inputs can be used to provide a simple starting solution with rich semantics which can be refined by the layer blocks that receive them to improve the next prediction.

In the example configurations shown in FIGS. 2 and 3, each layer block is active for all of the time steps at which a video frame is received.

In the multi-rate clock configuration 430, on the other hand, not all layer blocks are active at all of the time steps, i.e., some of the layer blocks are active for only a proper subset of the time steps.

In particular, features extracted deeper in a neural network tend to be more abstract and to vary less over time. For example, when tracking a non-rigid moving object, the contours, which are shallow features, change rapidly, but the identity of the object typically does not change at all. Since not all features change at the same rate as the input rate, it is then possible to reduce computation by reusing, and not recomputing, the deeper, more abstract, features. This can be implemented by having multi-rate clocks as shown in configuration 430: whenever the clock of a layer block does not tick, i.e., the layer block is not active for a given time step, that layer block does not compute outputs, instead it reuses the existing ones, i.e., the outputs generated by the layer block at the most recent time step at which the layer block was active. Thus, in the configuration 430, the first layer block is active for all of the time steps, the second layer block is active at every other time step, the third layer block is active for every fourth time step, and the output layer is active at each time step. In other words, clock rates are reduced by a factor of two between each layer block in the sequence (but the output layer may be always active). In other multi-rate clock configurations, clock rates can change differently. Generally, however, each layer block is active for either the same number or a smaller number of time steps as any earlier layer block in the sequence.

At each time step at which a given component is active, the component, e.g. layer block, receives as input the output generated by the particular component, i.e., layer block, immediately before the given component in the sequence at the most recent past time step at which the particular component was active. Thus, the output layer receives the same input at time steps 1, 2, 3, and 4 (because the vertical connections shown in FIG. 4 are not included in depth-parallel configurations).

The modifications depicted in configurations 410, 420, and 430 can be applied to either a depth-parallel or a predictive depth-parallel configuration. For example, either the depth-parallel or predictive depth-parallel configuration can be augmented with one or more feedback connections, with temporalisation, or both, to improve prediction accuracy. As another example, either the depth-parallel or predictive depth-parallel configuration can be augmented with multi-rate clocks to improve computational efficiency.

In order for the neural network to generate accurate predictions, the system trains the neural network on training data. The training data includes a set of training video segments and, for each video segment, a corresponding ground truth output. When the task requires a single prediction, the ground truth output includes a single output for each video segment. When the task requires predictions for each of multiples frames, the ground truth output includes a respective output for each of the frames for which an output is required; the training may thus be frame-by-frame.

The system trains the neural network, i.e., determines trained values of the parameters of the neural network, on the training data to optimize an objective function, e.g., to minimize a loss function, that measures the error between the outputs generated by the neural network and the ground truth outputs. For example, the error can be a cross-entropy loss. In order to configure the neural network for predictive depth parallelism, the objective function measures the error between the ground truth output for a given frame and the prediction made at the time step that is l time steps after the given frame in the training segment, where l is the prediction latency.

The system can optimize this objective function using conventional supervised learning techniques, e.g., stochastic gradient descent with momentum or Adam.

While the proposed parallel configurations reduce latency and computational resource consumption, their computational depth for the current frame at the time at which they produce an output for the current frame is also reduced compared to their fully sequential counterparts. Additionally, some configurations are designed to re-use features from previous states through the multi-rate clocks mechanism.

In some cases, the system accounts for these factors by augmenting the training of the neural network by making use of a conventional sequential neural network that has been trained to perform the same task and that has the same overall architecture as the parallel neural network. Because the conventional sequential neural network does not employ the parallelization techniques described in this specification, all of its layers always have access to fresh features extracted from the current frame.

During the training of the parallel neural network, the objective function can include an additional term that encourage activations to match those of the sequential model for some predetermined layers (while still optimizing the original objective function). Therefore, the parallel model can be encouraged generate abstract features that match how the features would have looked, had the information from the current frame been available. This additional term can be implemented as, for example, for each predetermined layer, a sum of the normalized Euclidean distance or other distance measure between the corresponding activations of the sequential and parallel models.

Figure 5:
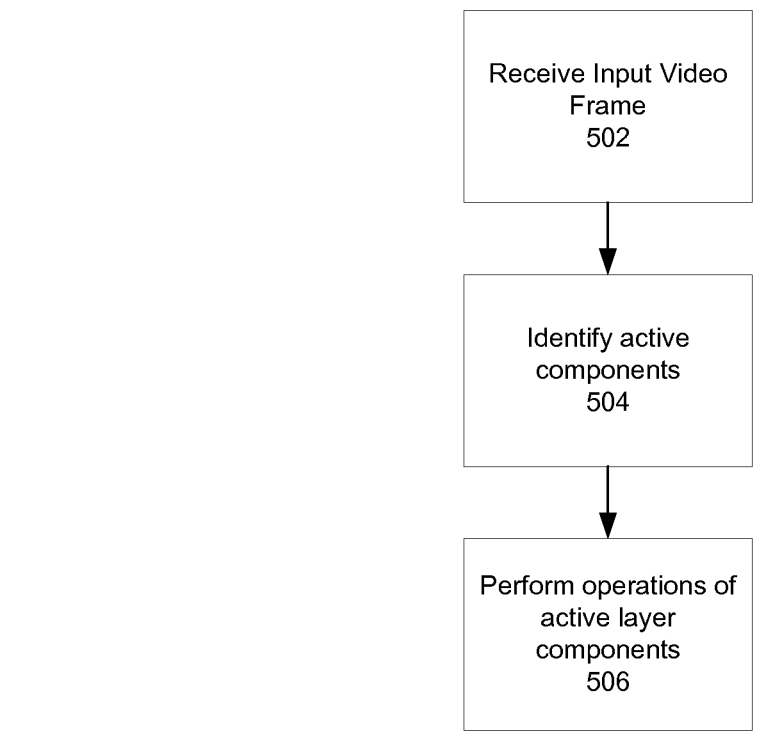
FIG. 5 is a flow diagram of an example process for processing a video segment.

FIG. 5 is a flow diagram of an example process 500 for processing a video segment. For convenience, the process 500 will be described as being performed by a system of one or more computers located in one or more locations. For example, a video processing system, e.g., the video processing system 100 of FIG. 1, appropriately programmed, can perform the process 500.

The system can perform the process 500 for each time step in a video segment to generate a video processing output for the video segment.

The system receives an input video frame at the time step (step 502).

The system identifies which components in the sequence are active at the time step (step 504). In particular, when multi-rate clocks are not being used, each component is active at each time step. When multi-rate clocks are being used, on the other hand, some components are active for only a proper subset of the time steps.

The system performs the processing of each active component for the time step (step 506) in accordance with the configuration of the neural network. In particular, each active layer block (other than the first layer block in the sequence) receives as input at the time step an output generated by a preceding layer block at one or more earlier time steps at which the preceding layer block was active, i.e., and does not receive any outputs generated by any other layer blocks at the time step. Because there are no dependencies between the operations performed by the active layer blocks at any given time step, when multiple layer blocks are active at the time step, the system performs the operations of two or more of the active layer blocks in parallel, e.g., by using multiple CPU cores to perform the operations or by using multiple GPUs to perform the operations. Additionally, the operations performed by the system are pipelined, i.e., each layer block that is active at the time step is operating on and generating data necessary to make the prediction for a different video frame.

While this specification describes processing videos, the described architectures and training schemes can be employed for neural networks that process other types of sequential data that have a relatively large amount of data per-timestep and for which it is beneficial to apply neural networks having multiple layer blocks. For example, the described techniques can be used to process and make predictions from streams of LIDAR (light detection and ranging) data or other sensor data, e.g., data collected by sensors of a robot or an autonomous vehicle.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. For example the system of FIG. 1 may be alternatively implemented partially or wholly in dedicated hardware.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method comprising:
receiving a video sequence comprising a respective video frame at each of a plurality of time steps; and
processing the video sequence using a video processing neural network to generate a video processing output for the video sequence,
wherein the video processing neural network includes a sequence of network components,
wherein the network components comprise a plurality of layer blocks each comprising one or more neural network layers,
wherein each component is active for a respective subset of the plurality of time steps, and
wherein each layer block is configured to, at each particular time step at which the layer block is active, receive an input derived from a video frame at a previous time step and generated by a component that precedes the layer block in the sequence of components and to process the input to generate a block output, wherein at each time step at which the layer block is active, the layer block does not receive as input any outputs generated by any other layer blocks at the time step.

2. The method of claim 1, wherein each layer block is active for a same number or fewer time steps than any layer block before the layer block in the sequence of components.

3. The method of claim 1,
wherein one or more of the layer blocks comprise an initial layer and one or more additional layers,
wherein the initial layer in each layer block receives an input generated at the previous time step by a component that precedes the layer block in the sequence of components, and
wherein each additional layer in each layer block receives an output generated by one or more layers at a lower depth level within the same layer block at the time step.

4. The method of claim 1, wherein one or more of the layer blocks in the sequence of components also receive as input a feedback output generated at a previous time step by one or more components after the block in the sequence of components.

5. The method of claim 1, wherein one or more of the layer blocks include three-dimensional convolutional layers with kernels that have a time dimension of two or more.

6. The method of claim 5, wherein each block that includes three-dimensional convolutional layers with kernels that have a time dimension of two or more also receives an input generated at another previous time step.

7. The method of claim 1, wherein the video processing output is a per-sequence output that includes a single prediction for the video segment.

8. The method of claim 1, wherein the video processing output is a per-frame output that includes a respective prediction for each of multiple frames in the video segment.

9. The method of claim 1, wherein the video processing neural network further comprises one or more layers after the final layer block in the sequence that are configured to receive the block outputs generated by one or more of the layer blocks and to process the block outputs to generate the video processing output.

10. The method of claim 1, wherein the processing comprises, at each time step:
performing the processing of two or more of the layer blocks in parallel.

11. The method of claim 1, wherein at each time step at which the layer block is active, the layer block does not receive as input any outputs generated by any other layer blocks at the time step.

12. The method of claim 1, wherein at each time step, each layer that is active operates on data derived from a different video frame than each other active layer block.

13. A system comprising one or more computers and one or more storage devices storing instructions that when executed by the one or more computers cause the one or more computers to perform operations comprising:
receiving a video sequence comprising a respective video frame at each of a plurality of time steps; and
processing the video sequence using a video processing neural network to generate a video processing output for the video sequence,
wherein the video processing neural network includes a sequence of network components,
wherein the network components comprise a plurality of layer blocks each comprising one or more neural network layers,
wherein each component is active for a respective subset of the plurality of time steps, and
wherein each layer block is configured to, at each particular time step at which the layer block is active, receive an input derived from a video frame at a previous time step and generated by a component that precedes the layer block in the sequence of components and to process the input to generate a block output, wherein at each time step at which the layer block is active, the layer block does not receive as input any outputs generated by any other layer blocks at the time step.

14. One or more non-transitory computer storage media storing instructions that when executed by one or more computers cause the one or more computers to perform operations comprising:
receiving a video sequence comprising a respective video frame at each of a plurality of time steps; and
processing the video sequence using a video processing neural network to generate a video processing output for the video sequence,
wherein the video processing neural network includes a sequence of network components,
wherein the network components comprise a plurality of layer blocks each comprising one or more neural network layers,
wherein each component is active for a respective subset of the plurality of time steps, and
wherein each layer block is configured to, at each particular time step at which the layer block is active, receive an input derived from a video frame at a previous time step and generated by a component that precedes the layer block in the sequence of components and to process the input to generate a block output, wherein at each time step at which the layer block is active, the layer block does not receive as input any outputs generated by any other layer blocks at the time step.

15. The system of claim 13, wherein each layer block is active for a same number or fewer time steps than any layer block before the layer block in the sequence of components.

16. The system of claim 13,
wherein one or more of the layer blocks comprise an initial layer and one or more additional layers,
wherein the initial layer in each layer block receives an input generated at the previous time step by a component that precedes the layer block in the sequence of components, and
wherein each additional layer in each layer block receives an output generated by one or more layers at a lower depth level within the same layer block at the time step.

17. The system of claim 13, wherein one or more of the layer blocks in the sequence of components also receive as input a feedback output generated at a previous time step by one or more components after the block in the sequence of components.

18. The system of claim 13, wherein the processing comprises, at each time step:
performing the processing of two or more of the layer blocks in parallel.

19. The system of claim 13, wherein at each time step at which the layer block is active, the layer block does not receive as input any outputs generated by any other layer blocks at the time step.

20. The system of claim 13, wherein at each time step, each layer that is active operates on data derived from a different video frame than each other active layer block.

\* \* \* \* \*